US 8,830,423 B2

(12) United States Patent
Yang et al.

(10) Patent No.: US 8,830,423 B2
(45) Date of Patent: Sep. 9, 2014

(54) LIQUID CRYSTAL DEVICE AND METHOD OF MANUFACTURE THEREOF

(75) Inventors: Bo-Ru Yang, Hsinchu (TW); Steve Elston, Oxford (GB); Peter Raynes, Worcestershire (GB); Han-Ping Shieh, Hsinchu (TW)

(73) Assignee: Merck Patent GmbH, Darmstadt (DE)

( * ) Notice: Subject to any disclaimer, the term of this patent is extended or adjusted under 35 U.S.C. 154(b) by 941 days.

(21) Appl. No.: 12/745,159

(22) PCT Filed: Nov. 27, 2008

(86) PCT No.: PCT/EP2008/010083
§ 371 (c)(1),
(2), (4) Date: Oct. 28, 2010

(87) PCT Pub. No.: WO2009/068287
PCT Pub. Date: Jun. 4, 2009

(65) Prior Publication Data
US 2011/0037938 A1 Feb. 17, 2011

(30) Foreign Application Priority Data
Nov. 30, 2007 (GB) .................................. 0723583.1

(51) Int. Cl.
G02F 1/1333 (2006.01)
C09K 19/02 (2006.01)
G02F 1/1337 (2006.01)

(52) U.S. Cl.
USPC ............. 349/93; 349/169; 349/183; 349/191; 349/94

(58) Field of Classification Search
USPC ................ 349/92, 93, 168, 169, 183, 191, 94
See application file for complete search history.

(56) References Cited

U.S. PATENT DOCUMENTS

| 6,222,605 | B1 | 4/2001 | Tillin et al. |
| 6,466,293 | B1 | 10/2002 | Suzuki et al. |
| 2002/0093613 | A1* | 7/2002 | Towler et al. ................. 349/123 |
| 2005/0052399 | A1* | 3/2005 | Hattori et al. ................... 345/99 |
| 2007/0001962 | A1* | 1/2007 | Hasegawa et al. .............. 345/95 |

FOREIGN PATENT DOCUMENTS

| EP | 0 768 562 A2 | 4/1997 |
| GB | 2 306 228 A | 4/1997 |
| WO | WO 98/16865 A1 | 4/1998 |

OTHER PUBLICATIONS

International Search Report of PCT/EP2008/010083 (Mar. 13, 2009).
T. Konno et al., "S23-2 OCB-Cell Using Polymer Stabilized Bend Alignment," Asia Display, (Oct. 16, 1995) XP002053149 pp. 581-583.
B. Yang et al., "Investigation of the Transient Symmetric H State in a Pi Cell," Applied Physics Letter, vol. 91 (2007) pp. 071119-1-071119-3.

(Continued)

Primary Examiner — Dennis Y Kim
(74) Attorney, Agent, or Firm — Millen, White, Zelano, Branigan, P.C.

(57) ABSTRACT

A method of making a liquid crystal device is provided, the method comprising
(i) providing a cell containing a mixture of a liquid crystal and pre-polymer
(ii) applying a stimulus to arrange the liquid crystal in a first predetermined state and
(iii) subsequent to, or contemporaneously with, step (ii), causing the pre-polymer to form polymer when the liquid crystal is in a second predetermined state,
wherein steps (ii) and (iii) are performed a plurality of times.

21 Claims, 7 Drawing Sheets

(56) References Cited

OTHER PUBLICATIONS

K. Chien et al., "Design and Fabrication of an Integrated Polarized Light Guide for Liquid-Crystal-Display Illumination," Applied Optics, vol. 43, No. 9 (Mar. 20, 2004) pp. 1830.

M. Towler et al., "LN-14 : A 1 Millisecond Response Time, Nematic LCD," EuroDisplay (2002) pp. 877-880.

K. Choi et al., "P-136: A Study on the Dynamic Characteristics of Bend Cell for Practical Application of OCB Mode LCD," SID 06 Digest (2006) pp. 713-716.

B. Yang et al., "High-Dynamic-Range Relaxed-Bend-State in a Pi Cell Stabilized by Synchronized Polymerization.".

B. Yang, "Simulation of Symmetric H State Lifetime Extension by Polymer Stabilization.".

S. Kim et al., "Electro-Optical Characteristics and Morphology of a Bend Nematic Liquid Crystal Device Having Templated Polymer Fibrils," Japanese Journal of Applied Physics, vol. 43, No. 11A (2004) pp. 7643-7647.

* cited by examiner

LIQUID CRYSTAL DEVICE AND METHOD OF MANUFACTURE THEREOF

FIELD OF THE INVENTION

The present invention relates to a liquid crystal device and a method of manufacture thereof, in particular, but not exclusively pi-cell type devices and a method of making the same.

DESCRIPTION OF THE RELATED ART

Many liquid crystal devices are arranged so that they may be switched (usually electrically) between two states (the two states, for example, corresponding to a dark and light state in liquid crystal displays). One state is obtained by applying a "low voltage" (possibly zero) and the second state may be obtained by applying a "high voltage" (higher than the "low voltage". The pi cell device may be used as a display device. When a low voltage is applied to the device, the liquid crystal molecules are arranged in a highly birefringent splay state. When a high voltage is applied to the device so that the device is in a switched state, the director profile of the liquid crystal is in a bend state and the birefringence of the device is markedly lower than in the unswitched state (the birefringent splay state) due to the change in orientation of liquid crystal molecules within the device. This change in birefringence can be used to good effect in a switchable display device. However, the transition between the unswitched splay state and the switched bend state involves the formation of one or more intermediate states (such as the anti-symmetric H state and the twist state). Transitions involving such states may be slow and are undesirable.

One possible way of overcoming the problem associated with the formation of undesirable intermediate states is to ensure that a voltage is always applied to the device so that the liquid crystal is always in one topographical state (typically a bend state). The lowest voltage applied is typically 2V RMS; at lower voltages, a transition to a twist state may occur. The highest voltage applied to the device is typically 6V RMS (this being the highest voltage typically available from electronics used in thin film transistor (TFT) devices). The birefringence of the device at 2V RMS is sufficiently higher than at 6V RMS for the device to operate satisfactorily. Given that the liquid crystal is always in a bend state between 2V RMS and 6V RMS, switching between 2V RMS and 6V RMS does not involve the formation of any intermediate states which form and dissipate slowly (such states typically occurring at less than 2V RMS), and so the performance of the device is improved. Such devices may suffer from a limited dynamic range. Furthermore, if the device is switched off, the device will relax to the splay state, and the reapplication of an electrical signal to the device in the splay state may cause undesirable, one-off electro-optic effects. Furthermore, the electro-optical performance of such devices may be limited due to the limited change in birefringence between 2V and 6V.

At least two other methods have been proposed to improve the performance of pi cell devices. Choi et al. (SID 06 Digest, P-136: "A study on the dynamic characteristics of bend cell for practical application of OCB mode LCD", pages 713-716) have proposed using a complex electrical addressing scheme for the improved operation of a pi-cell device. Such addressing schemes may be difficult and expensive to implement, for example, using conventionally available device driving technology.

EP0768562 and Chien and Kim ("Electro-optical characteristics and morphology of a bend nematic liquid crystal device having templated polymer fibrils", *Jpn. J. Appl. Phys.*, 2004, No. 11A, p. 7643-7647) teach that pi cell-based devices may be made by incorporating a polymer-forming material into the liquid crystal and forming a polymer by exposing the polymer-forming material to ultra-violet (UV) light. A relatively high voltage is applied continuously to a pi cell device and the device is concurrently exposed to UV radiation (when the voltage is being applied to the device). The formation of the polymer stabilises the bend state so that when the voltage is removed, the device does not relax back to the splay, or other intermediate, state but rather remains in a bend state. This means that the device may be readily operated between 0V and a higher voltage without the formation of any undesirable intermediate states.

SUMMARY OF THE INVENTION

The device and method of the present invention seeks to address one or more of the problems associated with the prior art.

In accordance with a first aspect of the present invention, there is provided a method of making a liquid crystal device, the method comprising
(i) providing a cell containing a mixture of a liquid crystal and pre-polymer
(ii) applying a stimulus to arrange the liquid crystal in a first predetermined state and
(iii) subsequent to, or contemporaneously with, step (ii), causing the pre-polymer to form polymer when the liquid crystal is in a second predetermined state,
wherein steps (ii) and (iii) are performed a plurality of times.

The method of the present invention may be used to stabilise the second predetermined state, for example, so that in the absence of any stimulus (such as the application of an electric field) the liquid crystal is in the second predetermined state or a topographically related state. For example, the second predetermined state may be a bend state, in which case, in the absence of any stimulus (for example, when no electric field is applied to the device) the liquid crystal in the device may also be in a bend state.

The method of the present invention may also be used to stabilise states which exist for short periods of time. For example, the switched HS state in pi-cell devices may only exist for a period of several milliseconds; by the repetitive driving of the cell to the switched HS state and contemporaneously causing polymer to form, then the HS state may be stabilised.

The liquid crystal may be in the nematic phase at room temperature.

Steps (ii) and (iii) may comprise the application of a switching voltage synchronised with the step of causing the formation of the polymer. Causing the formation of the polymer may comprise exposing the cell to electromagnetic radiation, so steps (ii) and (iii) may comprise the application of a switching voltage synchronised with exposing the cell to electromagnetic radiation. The application of a switching voltage may comprise the application of pulses of switching voltage, and exposing the cell to electromagnetic radiation may comprise exposing the cell for a finite period of time in synchronicity with the application of the pulses of switching voltage. Typically, the cell may be exposed to electromagnetic radiation for a finite period of time per switching pulse applied.

The cell may be exposed to electromagnetic radiation at the same time as a switching is applied. Alternatively, there may be a time difference between the application of a switching pulse and the exposure of the cell to electromagnetic radiation. The exposure of the cell to electromagnetic radiation may therefore be timed to coincide with the liquid crystal being in the second predetermined state.

Pulses of switching voltage may be from 1 ms to 1 s in duration. The finite period of time for which the cell is exposed to electromagnetic radiation depends on the lifetime of the second predetermined state, but may be, for example, from 1 ms to 1 s.

Causing the formation of the polymer may be achieved by exposing the cell to electromagnetic radiation. This radiation may typically be ultraviolet radiation, depending on the stimulus required for cause formation of the polymer from the pre-polymer. Alternatively, infra-red radiation incident on the cell may be used to heat the pre-polymer, and this may be of use if the formation of polymer is heat-activated. If the formation of the polymer is heat-activate, alternative methods for heating the pre-polymer could be used; for example, fast acting heater devices may be used.

Steps (ii) and (iii) may be performed a multiplicity of times. Steps (ii) and (iii) may typically be performed from 10 to $10^{10}$ times, preferably from 100 to $10^6$ times and more preferably 100 to $10^4$ times. The number of times will depend on factors such as the lifetime of the second predetermined state and the power of a source of electromagnetic radiation.

The cell may comprise one or more substrates. The cell preferably comprises two substrates; these two substrates may be mutually opposed. One or more of the substrates may be provided with an alignment surface for aligning the liquid crystal. One or more of the alignment surfaces may be arranged to produce a pretilt in liquid crystal molecules in the proximity of the alignment surface. The liquid crystal material in the cell provided in step (i) may be in a splay state. This may conveniently be achieved by providing two substrates, each with an alignment surface of rubbed polymer, the substrates being arranged so that the rubbing direction of each of the alignment surfaces is the same.

One or both of the substrates may be provided with one or more electrodes for electrically addressing the liquid crystal. It is convenient for each of two substrates to be provided with one or more electrodes. In certain circumstances, it may be beneficial for only one substrate to be provided with one or more electrodes (for example, if the device is to be an in-plane switching device).

The liquid crystal device may be a surface mode device. The liquid crystal device may be a non-surface mode device.

The stimulus to arrange the liquid crystal in the first predetermined state may be an electric field.

The pre-polymer may be a reactive mesogen(polymerisable mesogenic compound). The weight of the pre-polymer (preferably a reactive mesogen) provided in step (i) may be at least 0.1% of the weight of the liquid crystal, preferably from 0.1% to 30% and more preferably from 1% to 5% of the weight of the liquid crystal. In certain circumstances, it may be preferably for the weight of the pre-polymer provided in step (i) to be from 3% to 15% (and preferably from 5% to 12%) of the weight of the liquid crystal.

The first predetermined state may be the same as the second predetermined state. For example, the first predetermined state may be the switched $H_S$ state which is discussed in more detail below.

It is preferred that causing the formation of the polymer predominantly occurs when the liquid crystal is in the second predetermined state i.e. for the majority of time in which the formation of polymer is caused the cell is in the second predetermined state. This may readily be affected by the synchronising the exposure of the cell to electromagnetic radiation with the application of the switching voltage, for example by applying pulses of a switching voltage in synchronicity with the cell being exposed to electromagnetic radiation for a finite period of time. Causing the formation of the polymer may also occur in another state (not being the second predetermined state) which is topographically the same as the second predetermined state. For example, the second predetermined state may be a bend state; causing the formation of the polymer may also occur in a more stressed bend state from which the second predetermined state is derived. It is further preferred that causing the formation of the polymer only takes place when the liquid crystal is in the second predetermined state.

The duration of the step of causing the formation of polymer will vary, depending, inter alia, on the lifetime of the second predetermined state. Step (iii) i.e. causing the formation of polymer may take place for less than 500 ms, typically for less than 300 ms and alternatively for less than 200 ms. The step of causing the formation of polymer may conveniently be synchronised with the application of a switching voltage. The synchronisation may be performed as described above.

It may be preferred that the stimulus is removed prior to step (iii). In this case, it is preferred that second predetermined state is different from the first predetermined state; however, it is further preferred that the second predetermined state is topographically the same as the first predetermined state. The first predetermined state may be a switched state and the second state may be a relaxed state derived from (and therefore related to) the switched state. For example, it may be preferred that both the first and second predetermined states are bend states. The second predetermined state may be a relaxed bend state. This may conveniently be achieved by synchronising the step of forming the polymer (for example, by exposing the liquid crystal to electromagnetic radiation) with the application of a switching voltage. The exposing of the liquid crystal to electromagnetic radiation may take place a predetermined time after the removal of the switching voltage. The switching voltage may be in the form of a pulsed electrical field, with the liquid crystal being exposed to electromagnetic radiation for a finite time after the application of each switching pulse.

The second predetermined state may be a transient state (the transient state may be, for example, a state which has a finite lifetime and wherein, in the absence of external stimulus, the liquid crystal assumes another (typically lower energy) state from the transient state). This lower energy state may, for example, be a twist state.

For example, the transient state may be a relaxed bend state. The relaxed bend state may be achieved by applying a switching voltage to the cell so that the liquid crystal is switched into a bend state (this is typically achieved by applying, for example, 2V RMS or more to a pi cell). Once the switching voltage is removed, a "relaxed" bend state is formed for a period of about 100 ms, after which the "relaxed" bend state forms a twist state. The relaxed bend state has a finite lifetime and, in the absence of a stimulus, forms another state (in this case, the twist state) from the relaxed bend state.

Another example of a transient state is the switched $H_S$ state. The switched $H_S$ state may typically be formed by applying a pulsed voltage (typically a pulsed AC voltage) to a pi cell. The switched (as opposed to the unswitched) $H_S$ state is only formed when the pulses of voltage are applied to the cell i.e. the state has a finite lifetime. Furthermore, when each voltage pulse is removed from the cell, the switched $H_S$ state relaxes into the unswitched $H_S$ state. The switched $H_S$ state is not readily formed by the application of a continuous (as opposed to a pulsed) AC voltage.

The bend state which is formed when a switching voltage (for example, 2V RMS or more) is applied to a pi cell is not a transient state because the liquid crystal will remain in this state for as long as the voltage is applied to the cell, and so this state does not have a finite lifetime.

Step (ii) may comprise the formation of a bend state, for example, by the application to the cell of a voltage of more than 1.5V RMS (and preferably more than 3V RMS). Step (iii) may comprise causing the formation of polymer from the pre-polymer subsequent to the removal of the voltage from the cell, preferably in a period of up to 500 ms subsequent to the removal of the voltage from the cell. In this case, causing the formation of the polymer from the pre-polymer may take place for a period of up to 500 ms, preferably up to 300 ms, more preferably up to 200 ms and more preferably from 10 to 100 ms. In this time period, it is believed that the liquid crystal is in a transient bend state. Without the application of an electric field the transient bend state forms a twist state some few 100 millisecond after removal of the voltage.

In order to make certain devices, it is preferred to perform step (iii) contemporaneously with step (ii), in which case the second predetermined state will be the first predetermined state. For example, this may be the case if one wishes to stabilise a switched state (the first predetermined state and the second predetermined state are the switched state). The method of the present invention is particularly useful if the lifetime of the switched state is, in the absence of any stabilising polymer, only small. This is the case, for example, in the non-surface mode state commonly known as the $H_S$ state; this state may be achieved by applying to pulsed voltage signal to a pi-cell device. The formation of the $H_S$ state is highly dependent on the pulsing regime; for example, if the mark-to-space ratio (i.e. the time for which the voltage is applied to the time for which the voltage is off) is too high, then the $H_S$ state may not be formed, the anti-symmetric $H_A$ state being formed instead. The time for which the voltage is applied to the cell is therefore small, and hence the period in which the device is in the switched $H_S$ state is small. It is useful to expose the cell when the cell is only in the switched $H_S$ state (as opposed to the unswitched $H_S$), and so repetitive exposure of the switched state is favourable, given that the switched state is so short-lived.

Step (ii) may therefore comprise applying a pulsed voltage to the cell, the mark-to-space ratio being from 1:10000 to 1:1 (and preferably from 1:500 to 1:2, and more preferably from 1:500 to 1:50) and causing the formation of polymer from the pre-polymer when the voltage is applied to the cell. The pulsed voltage may typically be a pulse of AC voltage (for example, of 10 KHz frequency). The voltage across the cell may typically be from 2V RMS to 10V RMS, and preferably from 4V RMS to 8V RMS.

It is preferred that the cell provided in (i) comprises template structures for assisting in stabilising a predetermined device state. The template structures typically extend across the thickness of the cell. The template structures may comprise liquid crystal, having a predetermined director profile in the template structure. The director profile in the template structure may have the substantially the same topographical structure as the predetermined device state which is to be stabilised.

The director profile of the template structure may be produced by the method of the present invention. For example, a device may be driven into the $H_S$ state using pulse fields as is known to those skilled in the art. Causing the formation of the polymer may be performed when the liquid crystal is in the switched $H_S$ state. It is anticipated that repetition of the causation of the formation of polymer when in the switched $H_S$ state will lead to the formation of walls comprising liquid crystal locked in the switched $H_S$ state or a relaxed version of the switched $H_S$ state. The template structure may be formed by using a mask so that only the desired parts of the cell are exposed to radiation.

In accordance with a second aspect of the present invention, there is provided a method of making a liquid crystal device, the method comprising:
(i) providing a cell containing a mixture of a liquid crystal and pre-polymer;
(ii) causing the liquid crystal to be arranged in a predetermined transient state; and
(iii) causing the pre-polymer to form polymer when the liquid crystal device is in the predetermined transient state.

The term "transient" refers to a state, for example, which may have a finite lifetime and wherein, in the absence of external stimulus, the liquid crystal assumes another (typically lower energy) state from the transient state). The term "transient" is explained further with reference to the method of the first aspect of the present invention.

Step (ii) may comprise applying a stimulus to arrange the liquid crystal in a first, predetermined state and removing the stimulus. For example, as described above in relation to the method of the first aspect of the present invention, the application of an electric field to a pi cell device may cause the formation of a switched (stressed) bend state. On removal of the field, a relaxed bend state forms for a period, typically of the order of about 100 ms, after removal of the field. Step (iii) may be performed when the liquid crystal is in the relaxed bend state.

The formation of a transient state may comprise applying a stimulus to arrange the liquid crystal in the predetermined transient state. In this case, step (iii) may be performed when the stimulus is applied. For example, it is possible to arrange the liquid crystal in what is generally known as an $H_S$ state by the application of a pulsed field. Due to the pulsing regime used, the liquid crystal is only in the switched $H_S$ state for a period of several milliseconds, thus the switched $H_S$ state is transient.

The device may be a surface mode liquid crystal device. The second, transient state may therefore be a surface mode state. A surface mode device is one in which the change in birefringence on the application of a voltage is primarily associated with changes in director configuration near to the surface of the cell (as opposed to in the middle of the cell).

It is preferred that steps (ii) and (iii) are repeated, preferably a plurality of times. Steps (ii) and (iii) may typically be performed from 10 to $10^{10}$ times, preferably from 100 to $10^6$ times and more preferably 100 to $10^4$ times.

Steps (ii) and (iii) may comprise the application of a switching voltage synchronised with the step of causing the formation of the polymer. Causing the formation of the polymer may comprise exposing the cell to electromagnetic radiation, so steps (ii) and (iii) may comprise the application of a switching voltage synchronised with exposing the cell to electromagnetic radiation. The application of a switching voltage may comprise the application of pulses of switching voltage, and exposing the cell to electromagnetic radiation may comprise exposing the cell for a finite period of time in synchronicity with the application of the pulses of switching voltage. Typically, the cell may be exposed to electromagnetic radiation for a finite period of time per switching pulse applied.

The cell may be exposed to electromagnetic radiation at the same time as a switching is applied. Alternatively, there may be a time difference between the application of a switching pulse and the exposure of the cell to electromagnetic radiation. The exposure of the cell to electromagnetic radiation may therefore be timed to coincide with the liquid crystal being in the second predetermined state.

Pulses of switching voltage may be from 1 ms to 1 s in duration. The finite period of time for which the cell is exposed to electromagnetic radiation depends on the lifetime of the second predetermined state, but may be, for example, from 1 ms to 1 s.

The method of the present invention facilitates the stabilisation of the transient state so that this transient state (or a related state, which will generally be a topographically similar). Such an approach avoids having transitions between topographically different states, such transitions being undesirable.

The first, predetermined state which is formed by the application of the stimulus may be a bend state (typically a switched bend state) and the predetermined transient state may be a bend state (typically a "relaxed" bend state).

The liquid crystal may be in the nematic phase at room temperature.

Causing the formation of the polymer may be achieved by exposing the cell to electromagnetic radiation. This radiation may typically be visible (typically near UV-visible radiation) or ultraviolet radiation, depending on the stimulus required for cause formation of the polymer from the pre-polymer. Alternatively, infra-red radiation incident on the cell may be used to heat the pre-polymer, and this may be of use if the formation of polymer is heat-activated. If the formation of the polymer is heat-activate, alternative methods for heating the pre-polymer could be used; for example, fast acting heater devices may be used.

The cell may comprise one or more substrates. The cell preferably comprises two substrates; these two substrates may be mutually opposed. One or more of the substrates may be provided with an alignment surface for aligning the liquid crystal. One or more of the alignment surfaces may be arranged to produce a pretilt in liquid crystal molecules in the proximity of the alignment surface. The liquid crystal material in the cell provided in step (i) may be in a splay state. This may conveniently be achieved by providing two substrates, each with an alignment surface of rubbed polymer, the substrates being arranged so that the rubbing direction of each of the alignment surfaces is the same.

One or both of the substrates may be provided with one or more electrodes for electrically addressing the liquid crystal. It is convenient for each of two substrates to be provided with one or more electrodes. In certain circumstances, it may be beneficial for only one substrate to be provided with one or more electrodes (for example, if the device is to be an in-plane switching device).

The stimulus to arrange the liquid crystal in the first predetermined state may be an electric field.

The pre-polymer may be a reactive mesogen. The weight of the pre-polymer (preferably a reactive mesogen) provided in step (i) may be at least 0.1% of the weight of the liquid crystal, preferably from 0.1% to 30% and more preferably from 1% to 5% of the weight of the liquid crystal. In certain circumstances, it may be preferably for the weight of the pre-polymer provided in step (i) to be from 3% to 15% (and preferably from 5% to 12%) of the weight of the liquid crystal.

It is preferred that causing the formation of the polymer predominantly occurs when the liquid crystal is in the predetermined transient state i.e. for the majority of time in which the formation of polymer is caused the cell is in the predetermined transient state. Causing the formation of the polymer may also occur in another state (not being the predetermined transient state) which is topographically the same as the second predetermined state. It is preferred that causation of the formation of the polymer is not performed when the liquid crystal is in a topographically different state from the predetermined transient state. For example, on relaxation through the transient state, a further state may be formed (for example, a twist state). This further state may not be topographically the same as the second, predetermined transient state.

The use of the term "transient" refers to states which have a finite lifetime and wherein, in the absence of external stimulus, the liquid crystal assumes another (typically lower energy) state from the transient state. Those skilled in the art will realise that once the methods of the present invention have been applied to stabilise states which were formerly transient, these formerly transient states are no longer transient.

In accordance with a third aspect of the present invention, there is provided a liquid crystal device made in accordance with the method of the first or second aspects of the present invention.

In accordance with a fourth aspect of the present invention, there is provided a liquid crystal device comprising a cell containing a mixture of liquid crystal in a predetermined state and polymer for stabilising the liquid crystal in the predetermined state, wherein the predetermined state corresponds to a state which, in the absence of the polymer, would be a transient state.

The predetermined state may be a surface mode state, such as a bend state. The surface mode state may, for example, by a relaxed bend state.

The cell gap of the device may be from 1 micron to 100 microns, preferably less than 10 microns, more preferably from 3 microns to 7 microns.

The birefringence of the liquid crystal may be from 0.01 to 1 at room temperature.

In accordance with a fifth aspect of the present invention, there is provided an apparatus comprising a device in accordance with the third or fourth aspects of the present invention. The apparatus may comprise a means for electrically addressing the device. The apparatus may further comprise a source of light arranged to emit light onto the device. The source of light may be a backlight. The apparatus may further comprise one or more polarisers.

BRIEF DESCRIPTION OF THE DRAWING(S)

Embodiments of the methods and devices of the present invention will now be described by way of example only with reference to the following figures of which:

DETAILED DESCRIPTION OF THE PREFERRED EMBODIMENTS

Figure 1:
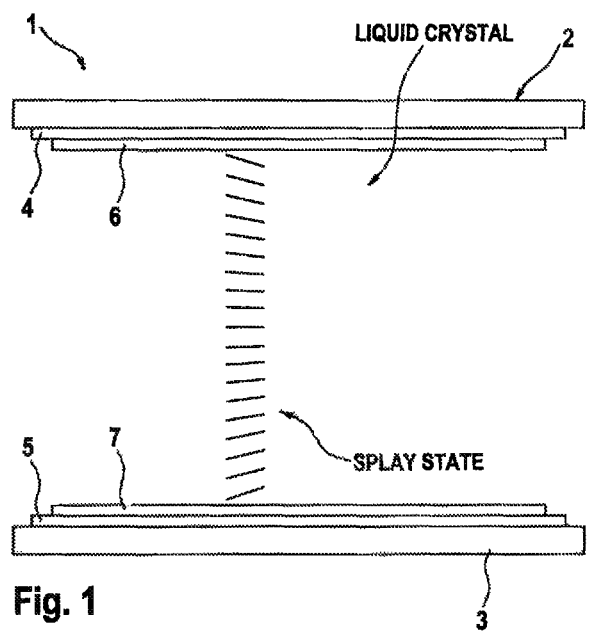
FIG. 1 shows a schematic cross-section through a known cell liquid crystal device.

FIG. 1 is a schematic cross-section through a known liquid crystal pi cell device, the device generally denoted by reference numeral 1. The device 1 comprises parallel, transparent substrates 2, 3 (usually made of glass or plastics material), a transparent, electrically conductive layer 4, 5 on each substrate (typically indium tin oxide (ITO)) and a liquid crystal alignment surface 6, 7 applied onto each of the electrically conductive layer 4, 5. The liquid crystal alignment surface 6, 7 may be provided by a rubbed polymer, a grating or an evaporated oxide, such as silicon oxide, as will be well known to those skilled in the art. The alignment surfaces 6, 7 will cause the liquid crystal molecules in the proximity of the alignment layer to generally align in one particular direction. The liquid crystal molecules in proximity to the alignment surface do not, on average, align parallel to the surface; they are tilted with respect to the plane of the alignment surface. This tilt is well known to those skilled in the art as "pretilt". The opposed alignment surfaces 6, 7 are arranged in what is generally known as a parallel manner, as shown in FIG. 1.

The elastic properties of the liquid crystal material mean that, in the absence of any applied stimulus, molecules remote from the alignment surfaces 6, 7 will generally align in the same direction as the molecules in the proximity of the alignment surfaces 6, 7. Alignment surfaces 6, 7 in the present example are formed by rubbing a polymer. The alignment surfaces are arranged so that the rubbing directions are in the same direction (commonly referred to as being parallel rubbing directions), therefore generating the surface alignment of liquid crystal shown in FIG. 1. Because of the so-called parallel rubbing directions the liquid crystal is in a splayed configuration throughout the device, due to the orientation of the liquid crystal molecules at the alignment surfaces being restrained by the strong interaction between the alignment surface and the liquid crystal molecules in proximity to the surface.

In the splay state, the device has a relatively large birefringence due to the orientation of the liquid crystal molecules.

Figure 2:
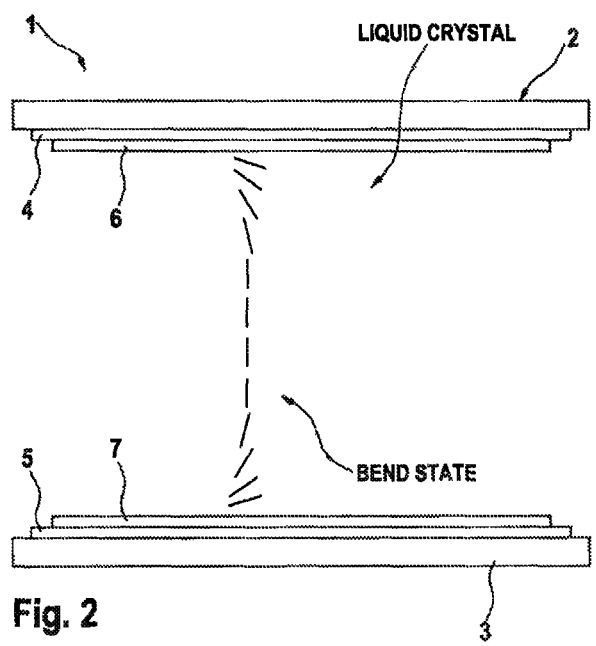
FIG. 2 shows the a schematic cross-section through the device of FIG. 1, wherein a switching voltage is applied to the device.

When a large voltage is applied to the device, the molecules align as shown in FIG. 2. The applied voltage orients the long axes of the liquid crystal molecules parallel to the electrical field. There is a strong interaction between the alignment surfaces 6, 7 and the molecules in proximity to the surface. This competition between the surface and the electric field, and the elasticity of the liquid crystal give rise to a bend state shown in FIG. 2.

The birefringence of the device in this bend state is relatively low compared to the birefringence of the splay state and so the device may be arranged between suitably oriented polarisers to produce a device which is switchable between dark and light states as is known to those skilled in the art.

EP0768562 and Chien and Kim (ibid.) teach that a bend state may be "locked into" the device by mixing a precursor of a polymer into the liquid crystal, applying a voltage to the device to form the bend state and exposing the device to UV radiation at the same time as applying the voltage to the device.

The exposure of the precursor to UV radiation causes the formation of a polymer. The formation of the polymer effectively stabilises the bend formation so that, on removal of the switching voltage from the device, the device does not relax to the splay state.

The inventors for the present invention have unexpectedly discovered that it is possible to produce an effective liquid crystal device based on a pi cell device by performing the polymerisation step when the device is in a transient (i.e. unstable) state. This may be achieved by synchronising the irradiation of the device when in a transient state with the application (and removal) of the switching voltage. The inventors have also discovered that it may be possible to stabilise states which it was not previously possible to be used in a device by synchronising the irradiation of a device with the application (and removal) of the switching voltage.

Figure 3:
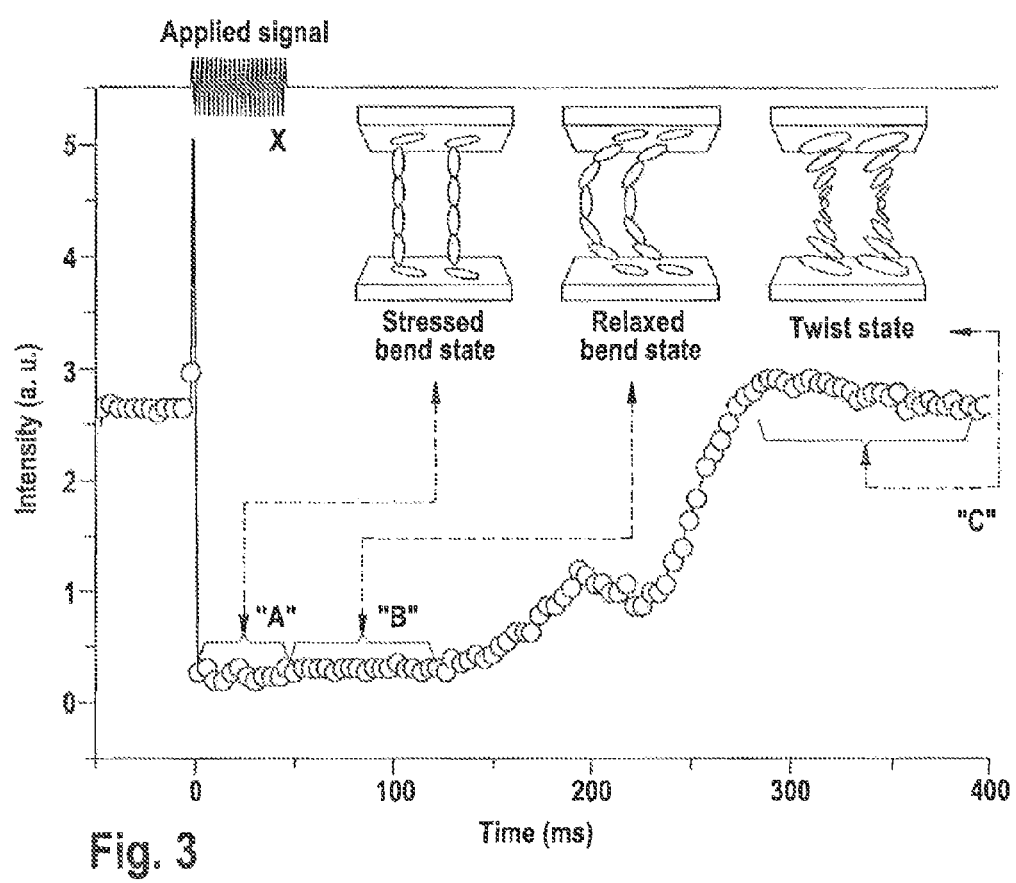
FIG. 3 shows a schematic representation of the electro-optical properties of the device of FIGS. 1 and 2, along with the believed director profile in various states during the switching process of a known pi cell.

A first example of an example of an embodiment of the first and second aspects of the present invention is now described with reference to FIGS. 3-7. In the absence of any stabilising polymer material in admixture with the liquid crystal, the electro-optical properties of a known pi-cell are shown in FIG. 3. The cell is approximately 5.5 microns thick. The liquid crystal is E7 (Merck). The alignment surfaces are provided by rubbed polymer and the alignment surfaces are arranged with parallel rubbing directions. The cell is placed between crossed polarisers and the rubbing direction of the cell is at an angle of 45 degrees to the incident polariser.

A relatively large voltage ($20V_{pp}$) is applied to the device for 50 ms (this region is labelled "A" on FIG. 3), causing the device to enter a switched state. The orientation of the molecules in the device is shown in FIG. 3, the arrangement of the molecules being in a bend state (sometimes referred to as a stressed bend state). This arrangement is maintained for as long as the voltage is applied. Once the voltage is removed (point X on FIG. 3), two regions (labelled "B" and "C") are visible in the optical response. It is believed that the region labelled "B" in the optical response corresponds to a "relaxed" bend structure as schematically indicated in FIG. 3, the device remaining in this state for about 80 ms. It is believed that the "relaxed" bend structure then forms a twist structure, region "C" of the optical response corresponding to the twist structure. The twist structure would eventually relax to a splay structure if a switching voltage were not applied to the device.

The inventors have found that admixture of polymer-forming material and the liquid crystal, and exposure of the mixture in the cell to UV radiation when the liquid crystal is in the "relaxed", transient, bend state illustrated in FIG. 3 causes the formation of a director profile which, on the removal of voltage, does not revert to the splay state and which has benefits over the device described in E20768562 and Chien and Kim.

Figure 4:
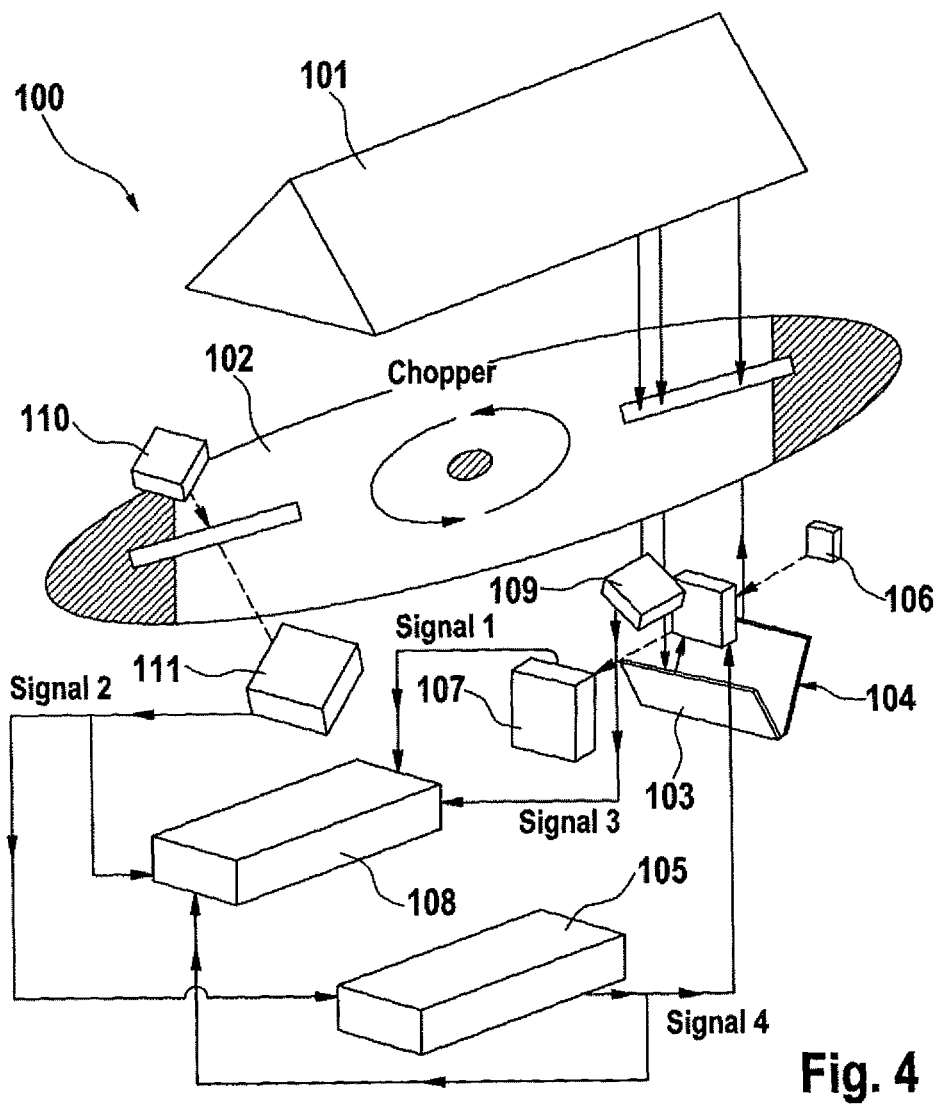
FIG. 4 is a schematic representation of an example of an apparatus for performing the method of making a liquid crystal device in accordance with an embodiment of the present invention.

An example of a method in accordance with the present invention for making a liquid crystal device is now described with reference to FIG. 4. FIG. 4 shows an apparatus used in the method of the present invention, the apparatus being denoted generally by reference numeral 100. The apparatus 100 comprises a source of ultraviolet radiation 101 and a mechanical, rotating chopper 102 for modulating the exposure of a cell to ultraviolet radiation. The source of ultraviolet radiation 101 is arranged to impinge on two mirrors 103, 104 arranged to reflect ultraviolet radiation onto both faces of a cell. The chopper 102 is circular and is provided with two slots (not labelled) for assisting in controlling the exposure of the cell to radiation.

The apparatus 100 further comprises a function generator 105 for supplying a switching voltage to a cell. The function generator may apply a pulse of AC (typically having a frequency of about 10 kHz), the pulse having a width from 1 microsecond to 1 second. The optical transmission of the device is monitored using laser diode 106 and photodiode 107, the optical transmission of the cell being indicative of the director profile in the cell. A further photodiode 109 is placed in proximity to a cell and is used to monitor the exposure of a cell to UV radiation. The signals from the photodiodes 107, 109 are transmitted to an oscilloscope 108 for display. A laser diode 110 and photodiode 111 are arranged to monitor the rotational period of the optical chopper. The output signal from the photodiode 111 is fed to the oscilloscope 108, and is also fed to the function generator 105 to trigger the electrical output of the function generator 105 to the cell. In this manner, the voltage applied to a cell by the function generator 105 is phase locked. The voltage applied to device is monitored on the oscilloscope 108. The operation of apparatus 100 to stabilise a transient bend state will now be described.

An example of a cell used in the method of the present invention is now described. The cell is approximately 5.5 microns thick. The cell substrates comprise glass of approximately 1 mm thickness onto which has been deposited a thin layer of conductive indium tin oxide (ITO). An alignment polymer has been deposited onto the ITO and rubbed. The cell has been assembled with parallel aligned rubbed polymer alignment layers. A mixture of E7 liquid crystal material (Merck) and 3% RM257 reactive mesogen (Merck) was introduced into the cell. The light source used was a mercury lamp emitting ultraviolet radiation with a wavelength of 365 nm.

Figure 5:
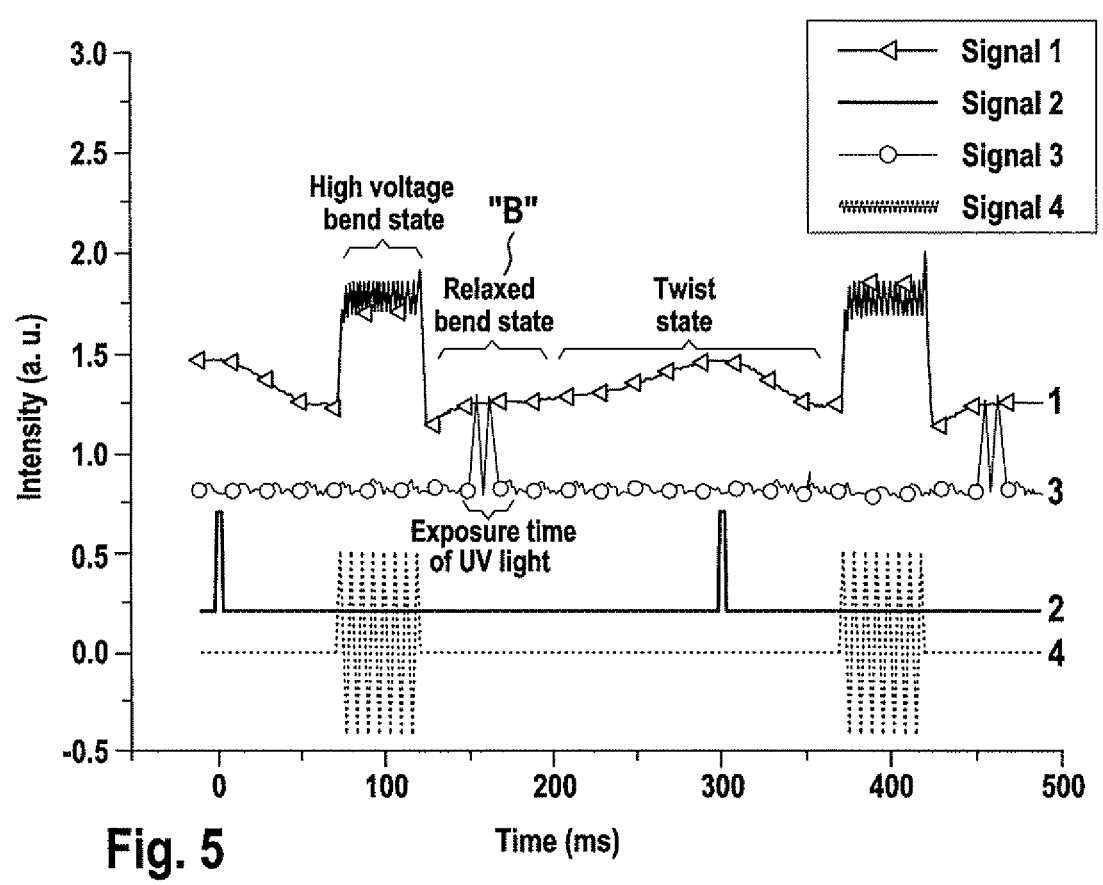
FIG. 5 shows the outputs from various photodiodes and from the signal generator of the apparatus of FIG. 5, indicating the synchronisation of the application of the voltage and the exposure of the device to UV radiation so that the device is exposed to UV radiation when in a transient bend state.

FIG. 5 shows the output of the photodiodes 107, 109, 111 and signal generator 105 when the cell described above was initially subjected to the method of the present invention (i.e. the polymer had yet to be formed in any appreciable amount). Signal 1 corresponds to the output of photodiode 107 relating to the optical transmission of the device. Signal 2 corresponds to the output of photodiode 111 relating to the rotational period of the chopper. Signal 3 corresponds to the output of photodiode 109 which monitors the exposure of the cell to the polymerising UV light and signal 4 corresponds to the output of the function generator 105.

As can be seen from FIG. 3 and Signal 1 in FIG. 5, the optical output of the cell prior to stabilisation of the bend state by the polymer indicates that the transient bend state exists for about 80 ms after removal of the switching voltage. This region of Signal 1 is labelled "B". Knowing the rotational frequency of the rotational chopper (as indicated by the two spikes in Signal 2), it is possible to time the application of the switching voltage to the cell (as indicated by Signal 4) so that the chopper permits irradiation of the cell when (and only when) the liquid crystal is in the transient bend state. The timing of irradiation of the cell is shown by the spikes in Signal 3. The apparatus 100 is therefore arranged to expose the cell to ultraviolet radiation at the appropriate time.

One can see from FIG. 5 that the cell is repeatedly driven to the switched bend state (shown in FIG. 3) by application of a relatively high voltage. After the switching voltage is removed the cell is exposed to UV irradiation for about 20 milliseconds when the device is in the relaxed bend state (shown in FIG. 3). This repeated exposure of the "relaxed" bend state leads to the formation of a device in which the liquid crystal is stabilised in a bend state, even if the switching voltage is removed from the device for a prolonged period of time.

The operation of a device made in accordance with a method of the present invention is now described.

Qualitative Comparison with Prior Art Devices

The devices under investigation were placed between crossed polarisers, with the rubbing direction of the alignment layers being at approximately 45 degrees to the angle of the crossed polarisers. A light box was used to illuminate the devices from below, and the devices were assessed by eye.

In the 0V condition, the device of the present invention is substantially free of disclination defects. A known pi cell without polymer stabilisation was made. This known pi cell showed disclination defects associated with the formation of the splay state from the intermediate twist state after being switched. A voltage of 2 volts was applied to the known pi cell, 2 volts representing the lowest working voltage of the device (assuming that the known pi cell is operated in a standard manner to avoid the formation of the twist and splay states). The brightness of the known pi cell was noticeably lower than the brightness of the device made in accordance with the method of the present invention when the device made by the method of the present invention was measured at 0V (its lowest operating voltage).

The device made by an example of a method in accordance with the present invention was compared to a device manufactured using the method described in Chien and Kim (ibid). The prior art device was prepared by preparing a cell containing an admixture of liquid crystal and reactive mesogen, applying a 7V RMS switching signal and exposing the device to UV radiation whilst the 7V RMS signal is applied. The bright state of the device made by the method of the present invention was noticeably brighter than the bright state of the prior art device.

Figure 6:
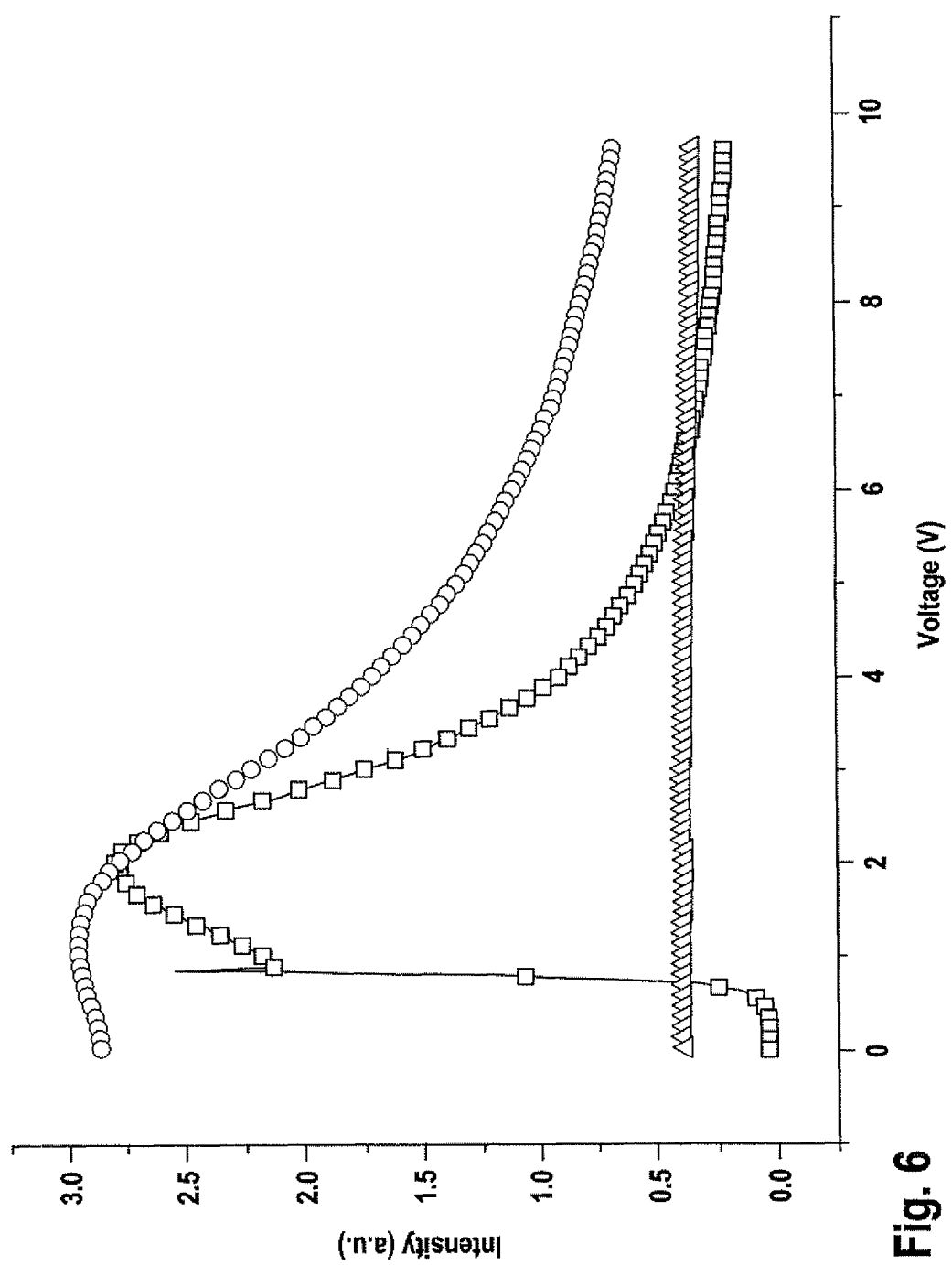
FIG. 6 shows the electro-optical characteristics of an example of an embodiment of a device in accordance with the present invention.

Quantitative measurements were performed on the devices described above. Transmission measurements as a function of applied voltage were made for each of the devices mentioned above, with the respective device placed between crossed polarisers, with the rubbing direction being at approximately 45 degrees to the direction of the crossed polarisers. The light source was, in this case, a laser-diode and the detector was a photodiode detector. The photodiode was placed "downstream" of the device and crossed polarisers as is well known to those skilled in the art. The results of the measurements are shown in FIG. 6. The performance of the prior art polymer stabilised device (denoted by "Δ") was poor, with a dull bright state at 0V. The known device without polymer stabilisation (denoted by "□") shows good brightness, but a voltage of around 2V has to be applied in order to achieve this brightness. The performance of the device made in accordance with a method of the present invention (denoted by "O ") can be seen to be good.

Those skilled in the art will realise that other types of radiation may be used to cause the formation of the polymer, such as infra-red radiation. Infra-red radiation may be used to heat the cell, which may be useful if the formation of the polymer is heat activated. Alternative methods of heating may be used, such as rapidly acting heaters. If the polymer is to be formed by heating, care should be taken to ensure that localised heating is not sufficiently large to cause formation of the isotropic phase.

If radiation is used to form the polymer, various types of light source may be used, such as lasers or light emitting diodes.

Whilst modulation of the exposure of the device to radiation has been achieved in the present example with a mechanical chopper device, it is anticipated that modulation may be achieved by modulating the output of the light source itself. This may be readily achieved using a pulsed laser or a pulsed light emitting diode, or other modulated or pulsed light source The method above requires the repetitive application of a switching field and irradiation to irradiate the transient bend state. It may be feasible under certain conditions to achieve the desired effect by exposing the cell to radiation only once. This may be achieved, for example, by using conditions which give relatively long-lived transient state, by the use of larger concentration of polymer-forming material, by using longer exposure to UV and/or by using high power source of radiation.

Figure 7:
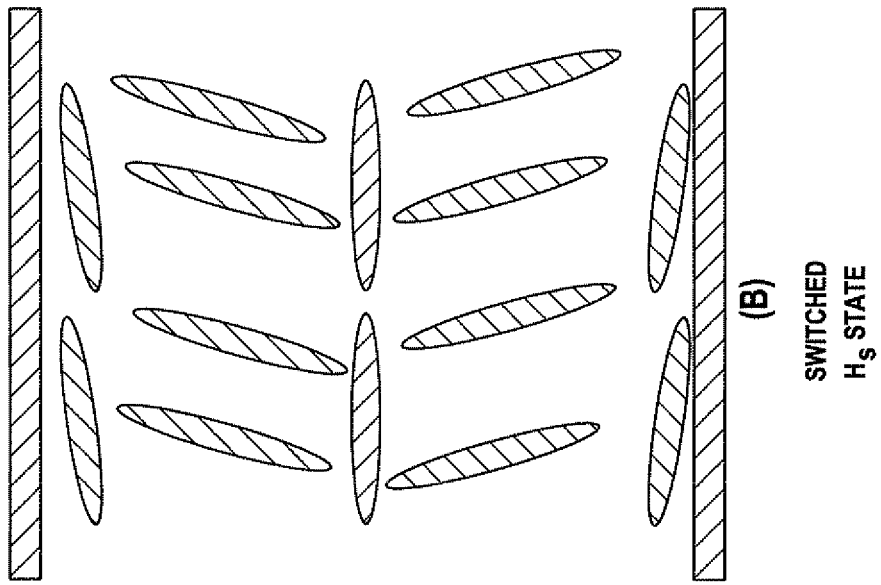
FIG. 7 shows schematic representations of the believed director profile in (A) the unswitched $H_S$ state and (B) the switched $H_S$ state.
Figure 7:
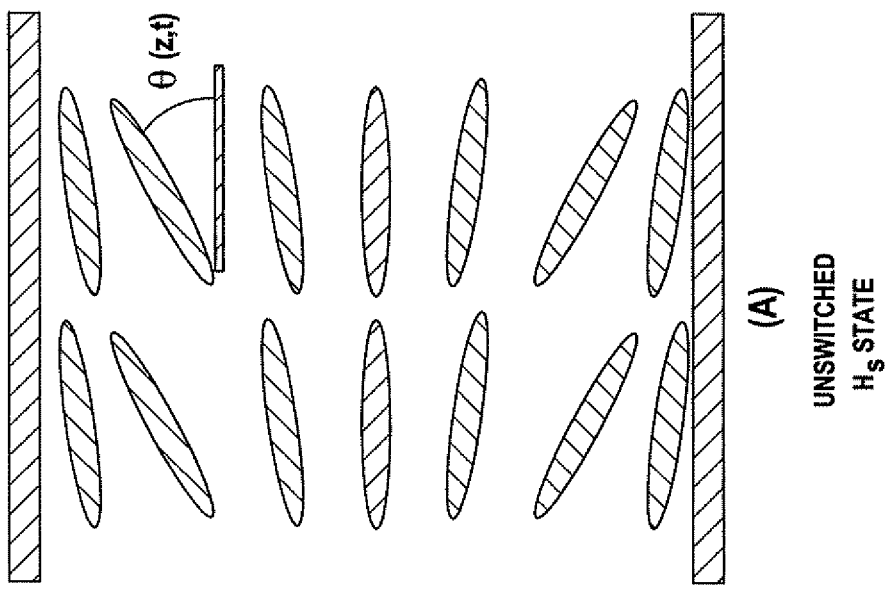

A further example of an embodiment of a method in accordance with the first aspect of the present invention is now described with reference to FIG. 7. This method involves stabilisation of a state often referred to as the $H_S$ state. Referring to FIG. 7, in the $H_S$ state, the director near the centre of the cell is pinned and is substantially parallel to the substrate, and the directors near to each of the alignment surfaces are rotated from the normal in an opposite sense to each other. The structure can therefore be likened to two Freedericksz cells in series.

The $H_S$ state may be formed by applying a pulsed voltage signal to a pi cell, for example as discussed by Towler and Raynes (Proceedings of Eurodisplay 2002, LN-14: "A 1 millisecond response time, nematic LCD"). The voltage and pulse mark to space ratio (i.e. the ratio of the time for which the voltage is applied to the time for which the voltage is off) may be varied in order to achieve the formation of the $H_S$ state. Those skilled in the art will be able to determine whether the $H_S$ state is formed by observing the electro-optical response of the cell; when the $H_S$ state forms (as opposed to the antisymmetric $H_A$ state), no reverse tilt walls are formed.

Using the method generally described with respect to FIG. 5, attempts were made without success to stabilise the $H_S$ state so that on removal of the pulsed voltage regime the $H_S$ structure is retained. It is believed that the lack of success may be related to the cell being in the switched $H_S$ state for a very short period of time (typically 2 ms) and that the pinning of the director at the middle of the cell is key for the formation of the $H_S$ state. It is believed that the exposure regimes applied so far have not caused pinning of the director at the centre of the cell.

It is anticipated that this may be overcome in the following manner. Walls may be formed by exposing selected areas of a mixture of liquid crystal and pre-polymer when in the HS state so that the director is pinned at the middle of the cell, as well as at or near to the substrates. This would be achieved using the apparatus of FIG. 4, synchronising the exposure of the cell to UV light with the formation of the switched HS state. Such exposure may be repeated many times in order to form a wall type structure. A mask would be provided which ensures that only desired areas of the cell are exposed to UV radiation. The cell would then contain large areas of liquid crystal and unexposed pre-polymer. The wall structure could then form a template director profile which would stabilise the formation of the $H_S$ state in the regions of liquid crystal and prepolymer not forming the wall, thus allowing the use of switching regimes which would permit the formation of $H_S$ states over longer periods of time in the liquid crystal not forming part of the walls. This would facilitate repeated exposure of the $H_S$ state to UV irradiation and thus the stabilisation of an $H_S$ related state. Computer modelling has suggested that the presence of such walls having a $H_S$ structure stabilises the formation of the switched $H_S$ state, permitting the formation of the switched $H_S$ state for sufficiently long periods of time to enable repeated exposure to irradiation in the switched HS state, thus stabilising the $H_S$ state.

Such wall structures may generally be small and may not be readily visible to the naked eye of the viewer.

The invention claimed is:

1. A method of making a liquid crystal device, the method comprising
   (i) providing a cell containing a mixture of a liquid crystal and pre-polymer
   (ii) applying a stimulus to arrange the liquid crystal in a first predetermined state and
   (iii) subsequent to step (ii), causing the pre-polymer to form polymer when the liquid crystal is in a second predetermined state,
   wherein steps (ii) and (iii) are performed a plurality of times,
      wherein the stimulus is removed prior to step (iii), and wherein the second predetermined state is different from the first predetermined state,
      wherein the first predetermined state is a switched state and the second state is a relaxed state derived from the switched state, and
   wherein both the first and second predetermined states are bend states.

2. A method according to claim 1 wherein the liquid crystal is in the nematic phase at room temperature.

3. A method according to claim 1 wherein causing the formation of the polymer is achieved by exposing the cell to electromagnetic radiation.

4. A method according to claim 1 wherein steps (ii) and (iii) are performed from 10 to $10^{10}$ times.

5. A method according to claim 1, wherein the cell provided in step (i) comprises two mutually opposed substrates, both of the substrates having been provided with an alignment surface for aligning the liquid crystal and being arranged to produce a pretilt in liquid crystal molecules in the proximity of the alignment surface, wherein the two alignment surfaces are arranged so that the liquid crystal is in a splay state.

6. A method according to claim 1, wherein the liquid crystal device is a surface mode device.

7. A method according to claim 1, wherein the weight of the pre-polymer provided in step (i) is from 0.1% to 30% of the weight of the liquid crystal.

8. A method according to claim 1, wherein causing the formation of the polymer predominantly occurs when the liquid crystal is in the second predetermined state.

9. A method according to claim 1, wherein causing the formation of the polymer only takes place when the liquid crystal is in the second predetermined state.

10. A method according to claim 1, wherein step (ii) comprises the formation of a bend state by the application to the cell of a voltage of more than 1.5V RMS.

11. A method according to claim 10 wherein step (iii) comprises causing the formation of polymer from the pre-polymer subsequent to the removal of the voltage from the cell in a period of up to 500 ms subsequent to the removal of the voltage from the cell.

12. A method according to claim 1, wherein steps (ii) and (iii) comprise the application of a switching voltage synchronized with the step of causing the formation of the polymer.

13. A method according to claim 12, wherein steps (ii) and (iii) comprise the application of a switching voltage synchronized with exposing the cell to electromagnetic radiation.

14. A method according to claim 13, wherein the application of a switching voltage comprises the application of pulses of switching voltage, and exposing the cell to electromagnetic radiation comprises exposing the cell for a finite period of time in synchronicity with the application of the pulses of switching voltage. comprising liquid crystal, having a predetermined director profile in the template structure.

15. A liquid crystal device made in accordance with the method of claim 1.

16. An apparatus comprising a liquid crystal device as claimed in claim 15, comprising a means for electrically addressing the device,
 wherein the liquid crystal device comprises the cell containing the mixture of liquid crystal in the first predetermined state and the pre-polymer for stabilizing the liquid crystal in the first predetermined state.

17. An apparatus according to claim 16 comprising a source of light arranged to emit light onto the device.

18. A method of making a liquid crystal device, the method comprising:
 (i) providing a cell containing a mixture of a liquid crystal and pre-polymer;
 (ii) causing the liquid crystal to be arranged in a first predetermined transient state by applying a stimulus; and
 (iii) causing the pre-polymer to form polymer when the liquid crystal device is in a second predetermined transient state having a finite lifetime,
  wherein the stimulus is removed prior to step (iii), and wherein the second predetermined transient state is different from the first predetermined transient state,
 wherein step (iii) is performed when the liquid crystal is in a relaxed bend state.

19. A method according to claim 18, wherein the device is a surface mode liquid crystal device.

20. A method according to claim 18, wherein steps (ii) and (iii) are performed a plurality of times.

21. A method according to claim 18, wherein the finite lifetime of the predetermined transient state is from 1 millisecond to 1 second.

* * * * *

UNITED STATES PATENT AND TRADEMARK OFFICE
CERTIFICATE OF CORRECTION

| | | |
|---|---|---|
| PATENT NO. | : 8,830,423 B2 | Page 1 of 1 |
| APPLICATION NO. | : 12/745159 | |
| DATED | : September 9, 2014 | |
| INVENTOR(S) | : Bo-Ru Yang et al. | |

It is certified that error appears in the above-identified patent and that said Letters Patent is hereby corrected as shown below:

IN THE CLAIMS:

Column 14, lines 66 – 67 (Claim 14), read as follows:

-- pulses of switching voltage comprising liquid crystal, having a predetermined director profile in the template structure. --

Should read as follows:

-- pulses of switching voltage. --

Signed and Sealed this
Seventeenth Day of March, 2015

Michelle K. Lee
*Director of the United States Patent and Trademark Office*